United States Patent
Adler et al.

(10) Patent No.: US 11,276,021 B2
(45) Date of Patent: *Mar. 15, 2022

(54) DETECTING BUSINESS ANOMALIES UTILIZING INFORMATION VELOCITY AND OTHER PARAMETERS USING STATISTICAL ANALYSIS

(71) Applicant: International Business Machines Corporation, Armonk, NY (US)

(72) Inventors: Steven B. Adler, Port Washington, NY (US); Hyman D. Chantz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1246 days.

This patent is subject to a terminal disclaimer.

(21) Appl. No.: 14/956,822

(22) Filed: Dec. 2, 2015

(65) Prior Publication Data
US 2016/0196515 A1 Jul. 7, 2016

Related U.S. Application Data

(63) Continuation of application No. 14/589,776, filed on Jan. 5, 2015.

(51) Int. Cl.
*G06Q 10/06* (2012.01)

(52) U.S. Cl.
CPC .............. *G06Q 10/0635* (2013.01)

(58) Field of Classification Search
CPC ....... G06F 16/36; G06F 16/367; G06N 5/025; H04L 63/14; H04L 47/24; H04L 47/2483;
(Continued)

(56) References Cited

U.S. PATENT DOCUMENTS 7,562,814 B1 7/2009 Shao et al.
8,082,209 B2 12/2011 Mullen et al.
(Continued)

OTHER PUBLICATIONS

Wikipedia "Array data structure", https://en.wikipedia.org/wiki/Array_data_structure (Year: 2014).*
(Continued)

*Primary Examiner* — Shelby A Turner
(74) *Attorney, Agent, or Firm* — Robert A. Voigt, Jr.; Shackelford, Bowen, McKinley & Norton, LLP

(57) ABSTRACT

A method, system and computer program product for detecting business anomalies. Enterprise data as well as compliance rules (e.g., business operational rules) are analyzed to identify entities and concepts to be placed in an ontology. The identified entities and concepts are represented as multi-dimensional vectors. The updates, movements and access to the enterprise data and compliance rules are tracked to determine parameters, such as information velocity, associated with at least some of the elements of the multi-dimensional vectors. The meaning from the enterprise data as well as from the data parameters is discerned. The discerned enterprise data and discerned data parameters are compared with the historical and/or projected utilization of the discerned enterprise data and discerned data parameters to identify any differences. Statistical analysis is then applied based on the enterprise data and the identified differences to generate a value corresponding to a prediction of a business anomaly.

5 Claims, 4 Drawing Sheets

(58) Field of Classification Search
CPC ............. H04L 47/2441; H04L 43/0876; H04L 43/026

See application file for complete search history.

(56) References Cited

U.S. PATENT DOCUMENTS

| | | | |
|---|---|---|---|
| 8,887,286 B2 | 11/2014 | Dupont et al. | |
| 2006/0059028 A1* | 3/2006 | Eder | G06Q 10/0631 705/7.12 |
| 2006/0212486 A1* | 9/2006 | Kennis | G06Q 40/04 |
| 2006/0229931 A1* | 10/2006 | Fligler | G06Q 10/0639 705/7.38 |
| 2010/0114630 A1* | 5/2010 | Adler | G06Q 10/0637 705/7.36 |
| 2014/0096249 A1* | 4/2014 | Dupont | G06F 21/552 726/23 |
| 2015/0163121 A1* | 6/2015 | Mahaffey | G06F 11/0766 707/687 |
| 2015/0229661 A1* | 8/2015 | Balabine | G06F 21/554 726/22 |
| 2016/0048937 A1* | 2/2016 | Mathura | G06Q 10/0635 705/30 |
| 2021/0157919 A1* | 5/2021 | Stockdale | H04L 63/1425 |

OTHER PUBLICATIONS

"Matrix", Techterms.com, https://techterms.com/definition/matrix (Year: 2013).*

Vectors vs. matrices, mikera/core.matrix Wiki, GitHub (Year: 2014).*

Owen et al. "Chapter 4: Vectors, Matrices, and Linear Algebra", Stanford University (Year: 2007).*

"Vectors and Matrices—Appendix A" http://web.mit.edu/15.053/www/AMP-Appendix-A.pdf. (Year: 2009).*

"What are N-Grams?", Text Mining, Analytics & More, text-analytics101.rxnlp.com/2014/11/what-are-n-grams.html (Year: 2014).*

"Artificial intelligence", https://searchenterpriseai.techtarget.com/definition /AI-Artifical-Intelligence (Year: 2020).*

"Semantic search", Towards Data Science, https://towardsdatascience.com/semantic-search-73fa1177548f (Year: 2019).*

"Semantic search", Techopedia.com, https://www.techopedia.com/definition/23731/semantic-search (Year: 2014).*

M. Suntinger, H. Obweger, J. Schieferand M. E. Grbller, "Event Tunnel: Exploring Event-Driven Business Processes," in IEEE Computer Graphics and Applications, vol. 28, No. 5, pp. 46-55, Sep.-Oct. 2008, doi: 10.1109/MCG.2008.97 (Year: 2008).*

C. -Y. Lin et al., "Social Network Analysis in Enterprise," in Proceedings of the IEEE, vol. 100, No. 9, pp. 2759-2776, Sep. 2012, doi : 10.1109/JPROC.2012.2203090 (Year: 2012).*

List of IBM Patents or Patent Applications Treated as Related, Dec. 2, 2015, pp. 1-2.

Office Action for U.S. Appl. No. 14/589,776 dated Nov. 23, 2018, pp. 1-30.

Office Action for U.S. Appl. No. 14/589,776 dated May 31, 2019, pp. 1-38.

Office Action for U.S. Appl. No. 14/589,776 dated May 15, 2020, pp. 1-56.

Office Action for U.S. Appl. No. 14/589,776 dated Jan. 9, 2020, pp. 1-50.

* cited by examiner

US 11,276,021 B2

DETECTING BUSINESS ANOMALIES UTILIZING INFORMATION VELOCITY AND OTHER PARAMETERS USING STATISTICAL ANALYSIS

TECHNICAL FIELD

The present invention relates generally to detecting business anomalies, and more particularly to detecting business anomalies, such as compliance concerns, utilizing information velocity and other parameters using statistical analysis.

BACKGROUND

Classifying data and detecting business anomalies, such as compliance concerns, are important issues, especially in highly regulated industries, such as the banking industry. Detecting such business anomalies is difficult since there are many entities, rules and regulations, various classifications of data, etc. For example, a large banking institution may have many different business elements, branches located in various geographical sites as well as being subject to intra-bank disclosure rules, banking regulations, rules governing storage and access of data, etc.

Currently, businesses do not have the means for detecting business anomalies, such as compliance concerns. Businesses currently have difficulty in discerning whether their internal processes are consistent, proper or controlled. For example, banking institutions have difficulty in determining whether they are complying with the applicable regulatory rules in connection with the mortgage or refinancing process. For instance, there could be underwriting errors or omissions that lead to compliance concerns. There is not currently a means for recognizing such errors or omissions programmatically. Instead, the banking institutions learn of these problems after the fact in a case by case scenario.

BRIEF SUMMARY

In one embodiment of the present invention, a method for detecting business anomalies comprises monitoring a flow of enterprise data. The method further comprises receiving compliance rules. The method additionally comprises analyzing the enterprise data and compliance rules to identify entities and concepts to be placed in an ontology. Furthermore, the method comprises representing the identified entities and concepts as multi-dimensional vectors. Additionally, the method comprises tracking updates, movements and access to the enterprise data and the compliance rules to determine information velocity and/or information acceleration associated with at least some elements of the multi-dimensional vectors, where the information velocity captures a speed and a direction of the flow of enterprise data concerning the elements of the multi-dimensional vectors and where the information acceleration captures a rate of increase in the flow of enterprise data concerning the elements of the multi-dimensional vectors. In addition, the method comprises discerning meaning from the enterprise data as well as from the information velocity and/or the information acceleration. The method further comprises comparing the discerned enterprise data, the discerned information velocity and/or the discerned information acceleration with historical and/or projected utilization of the discerned enterprise data, the discerned information velocity and/or the discerned information acceleration to identify any differences. The method additionally comprises applying, by a processor, a statistical analysis based on the enterprise data and the differences to generate a value corresponding to a prediction of a business anomaly. Furthermore, the method comprises performing an action indicating the business anomaly in response to the value exceeding a threshold.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
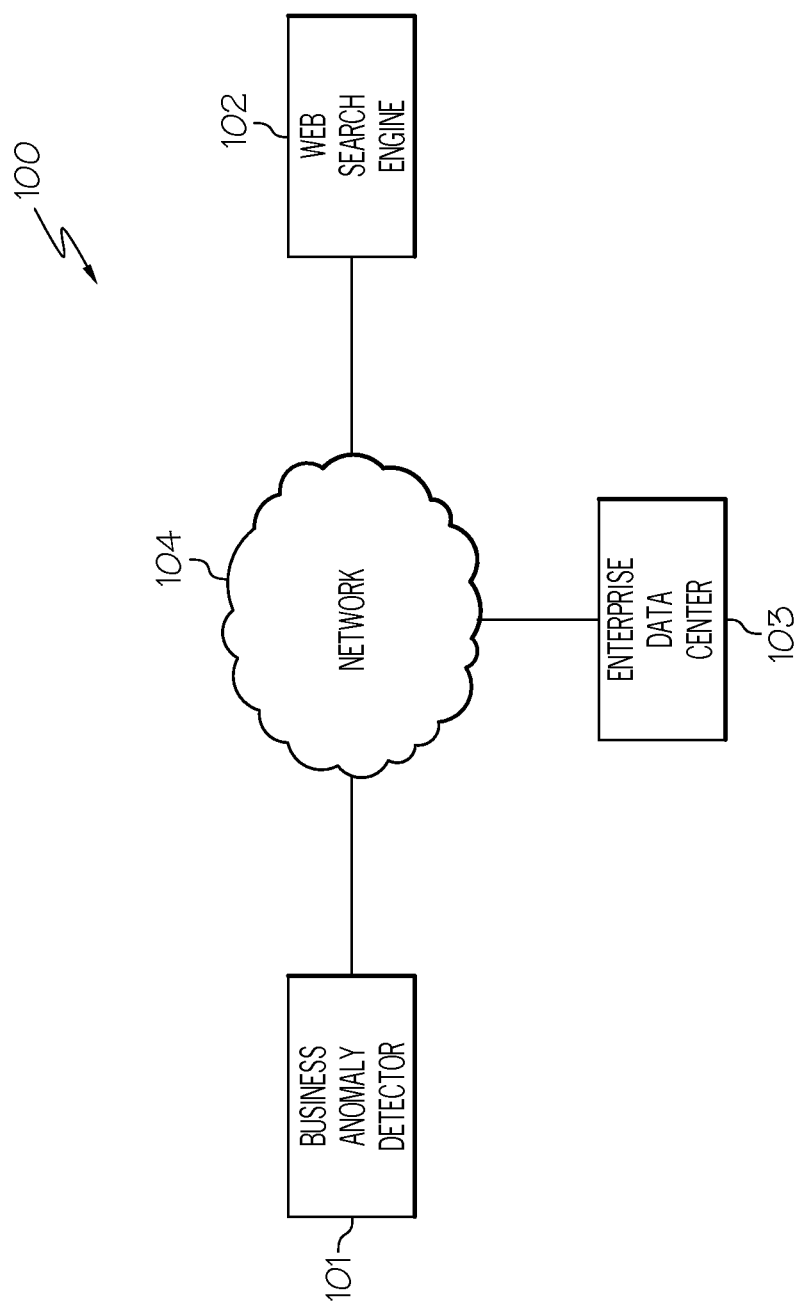
FIG. 1 illustrates a system for detecting business anomalies in accordance with an embodiment of the present invention.

The present invention comprises a method, system and computer program product for detecting business anomalies (e.g., compliance concerns). In one embodiment of the present invention, a flow of enterprise data (e.g., business data) is monitored. The enterprise data as well as compliance rules (e.g., business operational rules, such as data that is encrypted must have government-readable keys, data must never been seen by employee A if made by employee B, banking regulations) are analyzed to identify entities and concepts to be placed in an ontology. An ontology, as used herein, refers to a formal naming and definition of the types, properties and interrelationships of the entities. The identified entities and concepts are represented as multi-dimensional vectors including the elements of origin, destination, jurisdiction and classification. The updates, movements and access to the enterprise data and compliance rules are tracked to determine parameters, such as information velocity and information acceleration, associated with at least some of the elements of the multi-dimensional vectors. Information velocity, as used herein, refers to the speed and direction of the flow of the enterprise data concerning the elements of the multi-dimensional vectors. Information acceleration, as used herein, refers to the rate of increase in the flow of the enterprise data concerning the elements of the multi-dimensional vectors. The meaning from the enterprise data as well as from information velocity, information acceleration and/or other data parameters is discerned. In one embodiment, such meaning is discerned using artificial intelligence, such as natural language processing. For example, if the employees at a business were looking at charter airplane prices, then such a meaning may be inferred based on keywords in the enterprise data, such as "charter airplane" and "prices." The discerned enterprise data, information velocity, information acceleration and other data parameters is compared with the historical and/or projected utilization of the discerned enterprise data, information velocity, information acceleration and other data parameters to identify any differences. For example, the historical information velocity for the enterprise data may relate to the transiting of the enterprise data through different departments of the business. However, when the discerned information velocity is compared with the historical velocity of the enterprise data, a difference, such as not transiting the enterprise data through some of the departments originally contemplated, may be identified. A statistical analysis is then applied based on the enterprise data and the identified differences to generate a value corresponding to a prediction of a business anomaly (e.g., compliance concern). If the value exceeds a threshold, then, an action (e.g., a notification) is performed indicating a business anomaly. In this manner, a business will be able to detect potential business anomalies, such as compliance concerns.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a system 100 for detecting business anomalies, such as business compliance concerns, utilizing information velocity and other parameters using statistical analysis. System 100 includes a device, referred to herein as the "business anomaly detector 101," connected to a web search engine 102 and an enterprise data center 103 via a network 104.

Business anomaly detector 101 is configured to detect business anomalies (e.g., compliance concerns) utilizing information velocity and other parameters (e.g., information acceleration) using statistical analysis as discussed further below. In particular, business anomaly detector 101 detects anomalous behavior in the enterprise data (e.g., data for each business unit, political, geographical, classification) obtained from an enterprise flow of data in enterprise data center 103. An "anomaly," as used herein, refers to an unusual pattern of behavior. Enterprise data center 103 refers to the facility that houses the computer systems and associated components, such as telecommunications and storage systems. The enterprise's traffic flows are monitored by business anomaly detector 101 to determine if there is any anomalous behavior as discussed further below. In one embodiment, as discussed further below, business anomaly detector 101 may utilize compliance rules to determine anomalous behavior.

Furthermore, business anomaly detector 101 may utilize the results from web search engine 102 performing a web search concerning the enterprise data and compliance rules received by business anomaly detector 101 for evidence of anomalous behavior (e.g., employee A has been looking at employee B transactions which may correspond to a compliance concern). Each search uncovers new opportunities to improve the statistical analysis used to determine business anomalies by adding types, properties and interrelationships of the entities involved in potential business anomalies in an ontology as discussed further below.

Network 104, may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Figure 2:
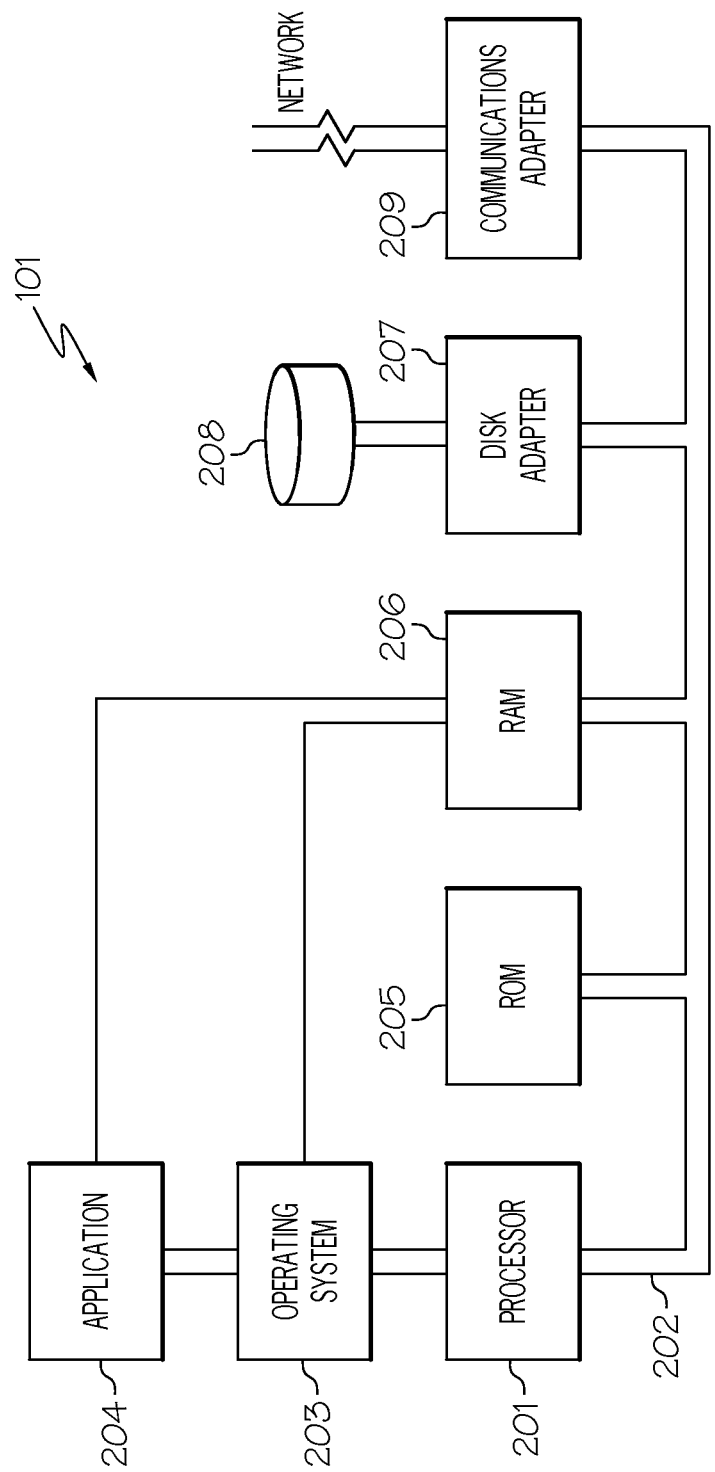
FIG. 2 illustrates a hardware configuration of a business anomaly detector configured in accordance with an embodiment of the present invention.

Referring now to FIG. 2, FIG. 2 illustrates a hardware configuration of business anomaly detector 101 (FIG. 1) which is representative of a hardware environment for practicing the present invention. Referring to FIG. 2, business anomaly detector 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for detecting business anomalies (e.g., compliance concerns) utilizing information velocity and other parameters using statistical analysis as discussed further below in association with FIGS. 3-4.

Referring again to FIG. 2, read-only memory ("ROM") 205 is coupled to system bus 202 and includes a basic input/output system ("BIOS") that controls certain basic functions of business anomaly detector 101. Random access memory ("RAM") 206 and disk adapter 207 are also coupled to system bus 202. It should be noted that software components including operating system 203 and application 204 may be loaded into RAM 206, which may be business anomaly detector's 101 main memory for execution. Disk adapter 207 may be an integrated drive electronics ("IDE") adapter that communicates with a disk unit 208, e.g., disk drive. It is noted that the program for detecting business anomalies (e.g., compliance concerns) utilizing information velocity and other parameters using statistical analysis, as discussed further below in association with FIGS. 3-4, may reside in disk unit 208 or in application 204.

Business anomaly detector 101 may further include a communications adapter 209 coupled to bus 202. Communications adapter 209 interconnects bus 202 with an outside network (e.g., network 104 of FIG. 1) thereby allowing business anomaly detector 101 to monitor the flow of enterprise data in enterprise data center 103 as well as communicate with web search engine 102.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, classifying data and detecting business anomalies, such as compliance concerns, are important issues, especially in highly regulated industries, such as the banking industry. Detecting such business anomalies is difficult since there are many entities, rules and regulations, various classifications of data, etc. For example, a large banking institution may have many different business elements, branches located in various geographical sites as well as being subject to intra-bank disclosure rules, banking regulations, rules governing storage and access of data, etc. Currently, businesses do not have the means for detecting business anomalies, such as compliance concerns. Businesses currently have difficulty in discerning whether their internal processes are consistent, proper or controlled. For example, banking institutions have difficulty in determining whether they are complying with the applicable regulatory rules in connection with the mortgage or refinancing process. For instance, there could be underwriting errors or omissions that lead to compliance concerns. There is not currently a means for recognizing such errors or omissions programmatically. Instead, the banking institutions learn of these problems after the fact in a case by case scenario.

Figure 3:
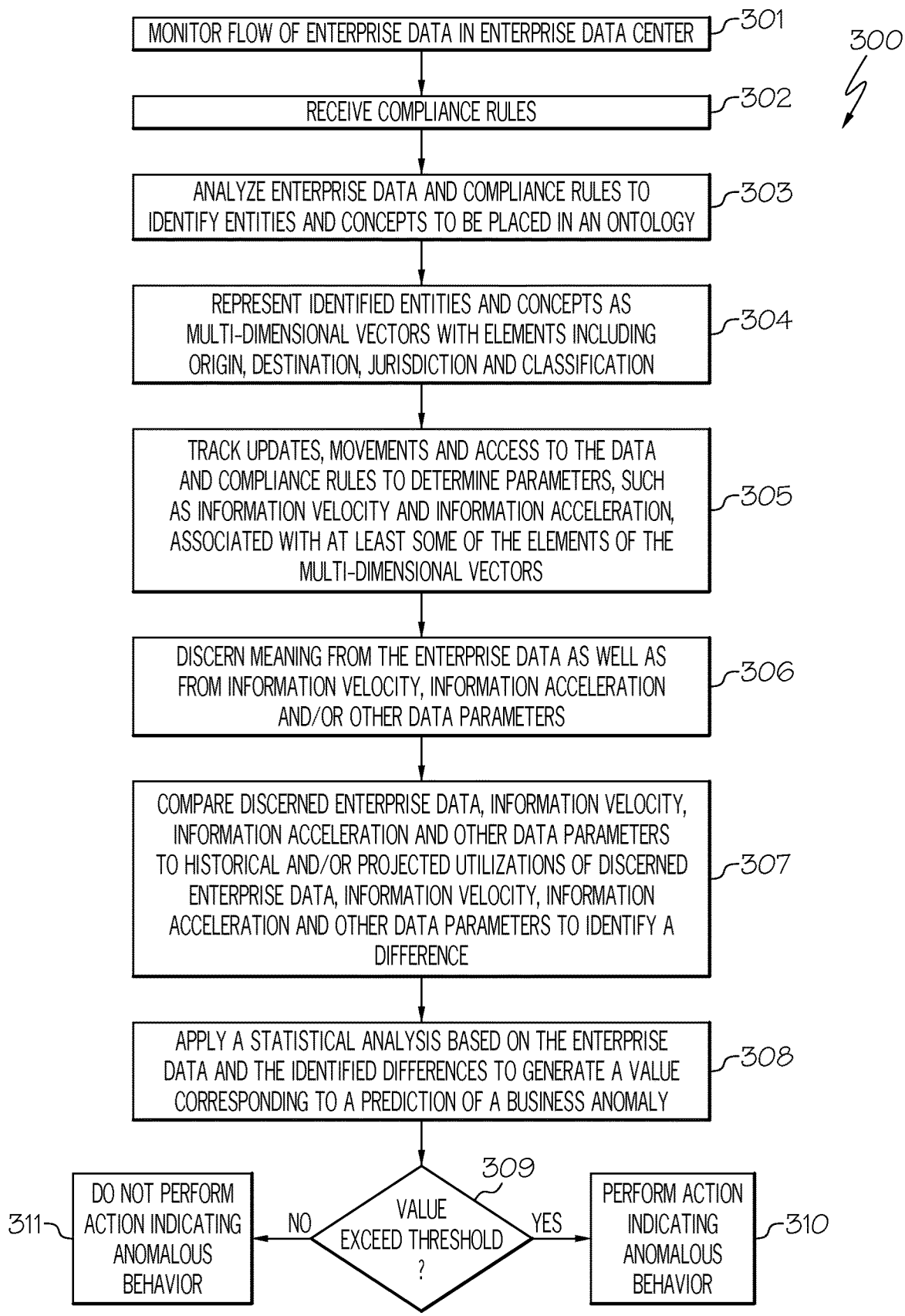
FIG. 3 is a flowchart of a method for detecting business anomalies utilizing information velocity and other parameters using statistical analysis in accordance with an embodiment of the present invention.
Figure 4:
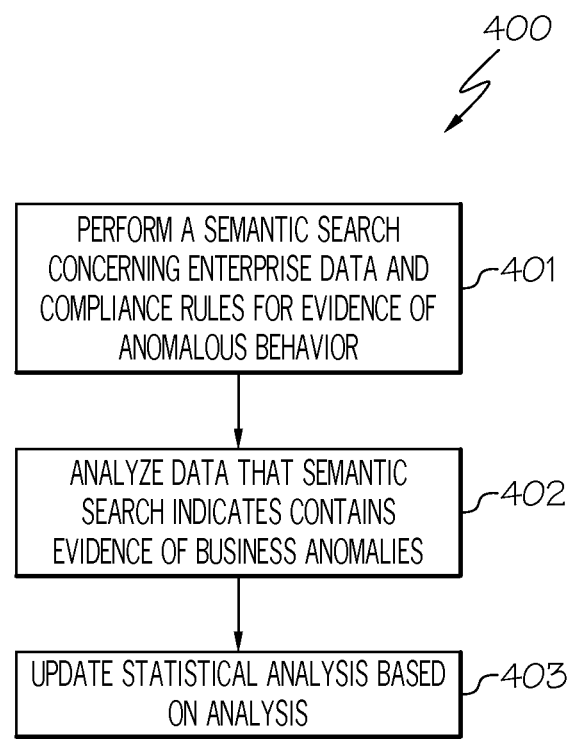
FIG. 4 is a flowchart of a method for updating the statistical analysis based on the analysis of the data that contains evidence of anomalous behavior in accordance with an embodiment of the present invention.

The principles of the present invention provide a means for detecting business anomalies, such as compliance concerns, utilizing information velocity and other parameters (e.g., information acceleration) using statistical analysis as discussed below in association with FIGS. 3-4. FIG. 3 is a flowchart of a method for detecting business anomalies, such as compliance concerns, utilizing information velocity and other parameters using statistical analysis. FIG. 4 is a flowchart of a method for updating the statistical analysis based on the analysis of the data that contains evidence of anomalous behavior.

As discussed above, FIG. 3 is a flowchart of a method 300 for detecting business anomalies, such as compliance concerns, utilizing information velocity and other parameters (e.g., information acceleration) using statistical analysis in accordance with an embodiment of the present invention.

Referring to FIG. 3, in conjunction with FIGS. 1-2, in step 301, business anomaly detector 101 monitors the flow of enterprise data (e.g., business data, accounts payable, invoicing, product descriptions, manufacturing instructions, financial, human resources, executive and management, product related) in enterprise data center 103.

In step 302, business anomaly detector 101 receives the compliance rules (e.g., business operational rules, such as data that is encrypted must have government-readable keys, data must never been seen by employee A if made by employee B, banking regulations). In one embodiment, compliance rules may be used to determine if the enterprise data exhibits anomalous behavior. In one embodiment, compliance rules may be inputted by a user or learned from monitoring the flow of enterprise data based on artificial intelligence. For example, the enterprise traffic flow may indicate various business operational rules that are identified using natural language processing.

In step 303, business anomaly detector 101 analyzes the enterprise data and compliance rules to identify entities and concepts to be placed in an ontology. An ontology, as used herein, refers to a formal naming and definition of the types, properties and interrelationships of the entities. Entities refer to something having a real or distinct existence in connection with a business anomaly, such as a compliance concern. For example, entities may refer to the employees, documents, etc. utilized in connection with a business. Concepts refer to the ideas that form the substance of the ontology. In one embodiment, the ontology is stored in a memory or storage unit of business anomaly detector 101 (e.g., memory unit 205, disk unit 208).

In step 304, business anomaly detector 101 represents the identified entities and concepts as multi-dimensional vectors including the elements of origin, destination, jurisdiction and classification. For example, the element of origin may involve the business unit origin of data. The element of destination may involve the geographical destination of data. The element of jurisdiction may involve the political, business department or business entity destination of data. The element of classification may involve prior classifications of the data.

In step 305, business anomaly detector 101 tracks updates, movements and access to the enterprise data and compliance rules to determine parameters, such as information velocity and information acceleration, associated with at least some of the elements of the multi-dimensional vectors. Information velocity, as used herein, refers to the speed and direction of the flow of the enterprise data concerning the elements of the multi-dimensional vectors. Information acceleration, as used herein, refers to the rate of increase in the flow of the enterprise data concerning the elements of the multi-dimensional vectors.

In step 306, business anomaly detector 101 discerns meaning from the enterprise data as well as from information velocity, information acceleration and/or other data parameters. In one embodiment, such meaning is discerned using artificial intelligence, such as natural language processing. For example, if the employees at a business were looking at charter airplane prices, then such a meaning may be inferred based on keywords in the enterprise data, such as "charter airplane" and "prices." In another example, if the information acceleration regarding charter airplane prices is mathematically illustrated in an acceleration-time graph, then one can infer an increase in a discussion of such a topic by the employees of the business based on the rapid increase in the rate of such a discussion. Such information may be used to identify a business anomaly if such a discussion is an unusual pattern.

In step 307, business anomaly detector 101 compares the discerned enterprise data, information velocity, information acceleration and other data parameters with the historical and/or projected utilization of the discerned enterprise data, information velocity, information acceleration and other data parameters to identify any differences. For example, the historical information velocity for the enterprise data may relate to the transiting of the enterprise data through different departments of the business. However, when the discerned information velocity is compared with the historical velocity of the enterprise data, a difference, such as not transiting the enterprise data through some of the departments originally contemplated, may be identified.

In step 308, business anomaly detector 101 applies a statistical analysis based on the enterprise data and the identified differences (see step 307) to generate a value corresponding to a prediction of a business anomaly (e.g., compliance concern). In one embodiment, the statistical analysis utilizes liner algebra, signal analysis and probability theory to generate a value corresponding to a prediction of a business anomaly. For instance, referring to the above example, if the difference between the determined information velocity and the historical information velocity for the enterprise data indicates that the enterprise data is not passing through some of the departments of the organization originally contemplated, then such a difference may be statistically quantified to a value based on the severity of failing to comply with a compliance rule. The greater the severity, the higher the value and the greater the prediction of a business anomaly, such as a compliance concern. Furthermore, in one embodiment, the statistical analysis may involve the absence of compliance terms as well as presence of compliance terms.

In step 309, a determination is made by business anomaly detector 101 as to whether the value (value generated in step 308) exceeds a threshold. If the value exceeds a threshold, then, in step 310, business anomaly detector 101 performs an action indicating a business anomaly. For example, actions such as a notification, a signal, a display update emphasizing the business anomaly and logging, may be utilized to indicate a business anomaly. In this manner, a business will be able to detect potential business anomalies, such as compliance concerns.

If, however, the value does not exceed a threshold, then, in step 311, business anomaly detector 101 does not perform an action indicating anomalous behavior.

The statistical analysis utilized herein may be continuing improved by further "learning" about business anomalies as discussed below in connection with FIG. 4.

FIG. 4 is a flowchart of a method 400 for updating the statistical analysis based on the analysis of the data that contains evidence of anomalous behavior in accordance with an embodiment of the present invention.

Referring to FIG. 4, in conjunction with FIGS. 1-3, in step 401, web search engine 102 performs a semantic search concerning the enterprise data (see step 301 of FIG. 3) and compliance rules (see step 302 of FIG. 3) for evidence of anomalous behavior. For example, an additional business anomaly may be identified or "learned" based on a business being held liable for the first time for not being compliant with a particular regulation. Such information may be added to the ontology for future use.

In step 402, business anomaly detector 101 analyzes the data that the semantic search indicates contains evidence of business anomalies. Such analysis may utilize artificial intelligence, such as natural language processing, to infer the meaning of the data that the semantic search indicates contains evidence of business anomalies.

In step 403, business anomaly detector 101 updates the statistical analysis based on the analysis. In this manner, the statistical analysis continues to be improved by further "learning" about business anomalies.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for detecting business anomalies, the method comprising:
    monitoring, by a computing device, a flow of network enterprise data in an enterprise data center, wherein said computing device is connected to said enterprise data center via a network, wherein said enterprise data center corresponds to a facility that houses computer systems and storage systems;
    receiving, by said computing device, compliance rules, wherein said compliance rules comprise business operational rules;
    analyzing, by said computing device, said network enterprise data and compliance rules to identify entities and concepts to be placed in an ontology, wherein said ontology comprises a formal naming and definition of types, properties and interrelationships of entities, wherein said entities comprise individuals or documents utilized in connection with a business, wherein said concepts comprise ideas that form a substance of said ontology;
    representing, by said computing device, said identified entities and concepts as multi-dimensional vectors, wherein elements of said multi-dimensional vectors comprise origin, destination, jurisdiction and classification;
    tracking, by said computing device, updates, movements and access to said network enterprise data to determine information velocity and information acceleration associated with at least some of said elements of said multi-dimensional vectors, wherein said information velocity captures a speed and a direction of said flow of network enterprise data concerning said elements of said multi-dimensional vectors, wherein said information acceleration captures a rate of increase in said flow of network enterprise data concerning said elements of said multi-dimensional vectors;
    discerning, by said computing device, meaning from said network enterprise data using natural language processing as well as discerning meaning from said information velocity and said information acceleration, wherein said meaning is discerned based on keywords identified in said enterprise data;
    comparing, by said computing device, said discerned network enterprise data, said discerned information velocity and said discerned information acceleration with historical and/or projected utilization of said discerned network enterprise data, said discerned information velocity and said discerned information acceleration to identify any differences;
    applying, by said computing device, a statistical analysis based on said network enterprise data and said differences to generate a value corresponding to a prediction of a business anomaly;
    performing, by said computing device, an action indicating said business anomaly in response to said value exceeding a threshold, wherein said action comprises a display update emphasizing said business anomaly and logging;
    performing, by a web search engine connected to said computing device via said network, a semantic search concerning said network enterprise data and said compliance rules for evidence of anomalous behavior;
    analyzing, by said computing device, data that said semantic search indicates contains evidence of said anomalous behavior; and
    updating, by said computing device, said statistical analysis based on said analysis of said data that said semantic search indicates contains evidence of said anomalous behavior.

2. The method as recited in claim 1, wherein said compliance rules are learned from monitoring said flow of network enterprise data based on artificial intelligence, wherein various business operational rules are identified from said flow of network enterprise data using natural language processing.

3. The method as recited in claim 1,
    wherein said analysis of said data that said semantic search indicates contains evidence of said anomalous behavior utilizes natural language processing to infer meaning of said data that said semantic search indicates contains evidence of said anomalous behavior.

4. The method as recited in claim 1, wherein said statistical analysis further utilizes an absence of compliance terms.

5. The method as recited in claim 1, wherein said statistical analysis utilizes linear algebra, signal analysis and probability theory to generate said value corresponding to said prediction of said business anomaly.

* * * * *